Feb. 4, 1958  S. FRIEDWALD  2,821,943
MOLD FRAME FOR USE IN CHOCOLATE MANUFACTURE
Filed Oct. 12, 1954
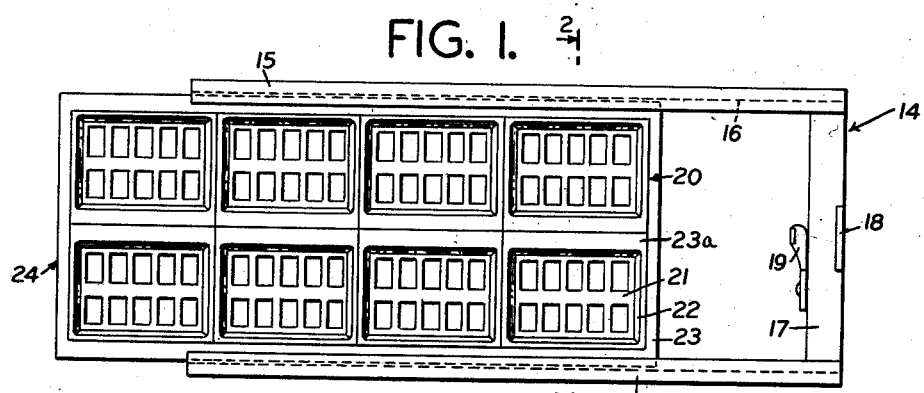
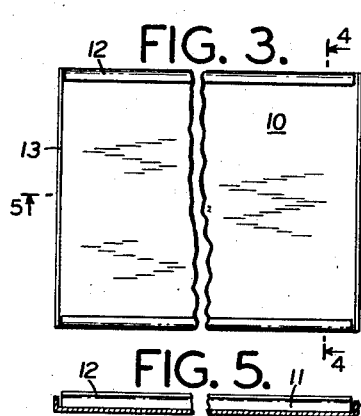
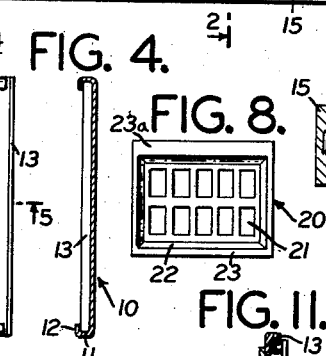
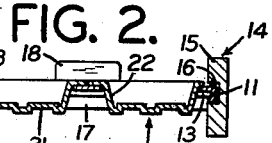
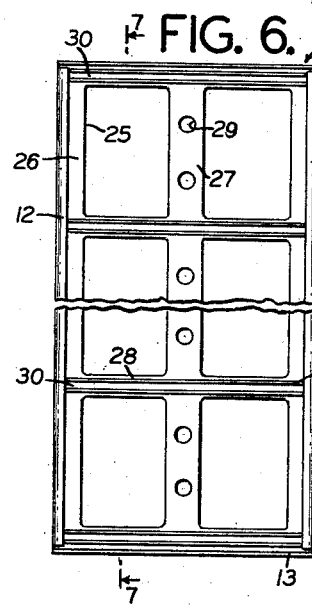
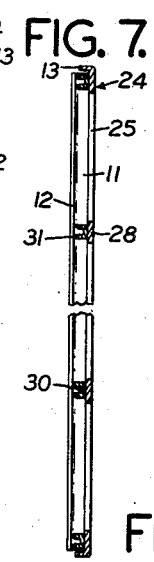
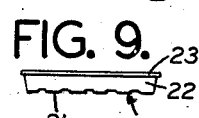
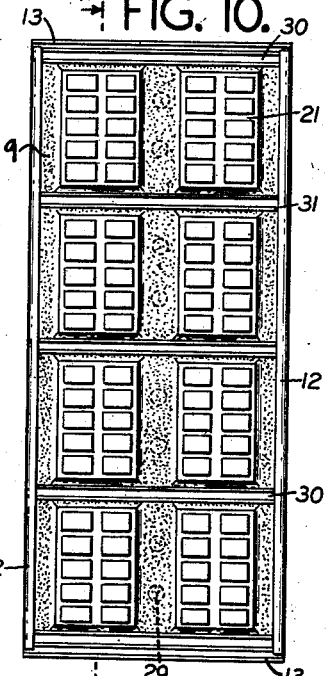
INVENTOR
SAMUEL FRIEDWALD.
BY
ATTORNEYS.

United States Patent Office 2,821,943
Patented Feb. 4, 1958

2,821,943

MOLD FRAME FOR USE IN CHOCOLATE MANUFACTURE

Samuel Friedwald, Rockville Centre, N. Y.

Application October 12, 1954, Serial No. 461,774

3 Claims. (Cl. 107—19)

This invention relates to improvements in mold frames for supporting molds used in the manufacture of chocolate bars and the like.

In the manufacture of chocolate bars or the like, it is the practice to employ a mold frame, upon which a plurality of molds are fixed, said mold frame being adapted to be inserted in a mold carrier, which is part of the machinery used in the manufacture of the chocolate bars or the like. The manufacture of mold frames and molds of the above type is a separate and distinct branch of industry.

While the mold frame and molds are not necessarily subjected to severe physical treatment during each run in the chocolate manufacture, it has been found that the accumulation of wear over a considerable period of time frequently results in breakage of individual molds and in breakage of mold frames. While the exact cause of such breakage is not necessarily important in the present instance, recent studies have indicated that the breakage of the molds and mold frames may be the result of what is known as "metal fatigue," which may be caused by alternate heating and cooling of said molds and mold frames during the chocolate making process.

In the past, it has been difficult to make the mold frame and the molds strong enough to avoid periodic breakage. One of the problems is that the molds are commonly manufactured on special order in relatively small amounts, so that it is difficult to manufacture the frames and the molds by mass production techniques, and considerable hand labor is necessary. Mold frames have commonly been fabricated from a plurality of pieces of metal which have been secured together by welding or soldering, and such mold frames have been relatively weak. While each mold frame commonly holds a plurality of molds, it has been found in the past that if one of the molds were damaged it was difficult to replace the individual mold without damaging the frame as a whole. Accordingly, it has been common practice in the candy industry, when a single mold has been damaged, to replace the entire frame and all the molds contained therein, which is a relatively costly procedure.

A primary object of this invention is to provide an improved mold frame blank which can be readily fabricated from a unitary sheet of metal, and which is sufficiently strong to be usable almost indefinitely, so that individual molds may be readily replaced without damage.

In accordance with the preferred embodiment of this invention, a sheet of pressed steel is bent downwardly and inwardly into channel form along its side edges, to produce the desired mold frame. The channel shape of the sides of this mold frame provides great structural rigidity against forces exerted in various directions upon the mold frame, and also provides the requisite thickness so that the mold frame may be inserted in the guide ways of existing mold carriers of existing chocolate factories. The mold frame blank may then be suitably cut out and molds may be secured thereto in the cut-outs.

Another object of this invention is to provide improved means for securing molds to the cut-out mold frame blank.

Another object of this invention is to provide a mold and mold frame assembly which is light in weight and durable, with the individual mold units being readily replaceable.

The low weight of the improved mold and mold frame assembly is an important feature of the invention. In the course of manufacture of chocolate bars, the mold and mold frame assembly is alternately heated and chilled, in order to heat and chill the chocolate carried thereby. The reduction in mass resulting from this invention makes it possible to heat and chill the chocolate more economically and more quickly. Furthermore, the low weight of the mold and mold frame assembly reduces the wear on the carrier equipment presently in use in chocolate bar factories.

Other objects and advantages of this invention will become apparent from the following description in conjunction with the annexed drawings, in which a preferred embodiment of the invention is shown.

In the drawings,

Fig. 1 is a top plan view of the assembled mold frame and molds, showing same mounted in a conventional mold carrier.

Fig. 2 is a section on line 2—2 of Fig. 1.

Fig. 3 is a bottom plan view of a mold frame blank which has been formed from a unitary sheet of pressed steel or the like.

Fig. 4 is a section on line 4—4 of Fig. 3.

Fig. 5 is a section on line 5—5 of Fig. 3.

Fig. 6 is a bottom plan view of a mold frame formed from the blank of Fig. 3, with the addition of reinforcing members and prior to the mounting of molds thereon. It will be understood that the mold frame of Fig. 6 is merely representative of a number of different shapes of mold frames which may be formed from the blank of Fig. 3, the particular shape and appearance of the mold frame depending in part upon the size and shape of the individual molds which are to be mounted thereon.

Fig. 7 is a section on line 7—7 of Fig. 6.

Fig. 8 is a top plan view of an individual mold which is to be mounted upon the mold frame of Fig. 6. It is to be understood that the blank of Fig. 3 may be formed into a frame different from that of Fig. 6 if the shape and size of the mold of Fig. 8 is varied.

Fig. 9 is a side elevation of the mold of Fig. 8.

Fig. 10 is a bottom plan view of the complete assembly of the mold frame and molds.

Fig. 11 is a section on line 11—11 of Fig. 10.

Upon reference to the drawings in detail, and in particular to Figs. 3–5 thereof, it will be noted that they show a mold frame blank 10 which has been formed from a unitary sheet of metal, said metal being optionally and preferably pressed steel. Said blank 10 is optionally of generally rectangular, longitudinally elongated shape. The side portions of blank 10 are bent downwardly and then inwardly along their entire length to define respective depending side flanges 11 and respective inturned bottom flanges 12, so that the sides of the blank are of channel shape. Flanges 12 are laterally spaced from each other and are spaced below and generally parallel to the main portion of the blank.

Optionally, the end portions of blank 10 are bent downwardly to define front and rear flanges 13, these flanges 13 being of approximately the same height as flanges 11 and being located respectively forwardly and rearwardly thereof.

It will be apparent that the improved frame blank 10 has a number of important advantages. Blank 10 is easily fabricated from a single piece of metal by standard means, such as presses or the like. The sides 11 of blank 10 possess great resistance to side thrusts upon the blank, as a result of the channel shape of the sides. As a result of the strength inherent in its shape, blank 10 may be made of relatively light material. Blanks 10 may be maintained in stock and may be punched out in a plurality of ways to accommodate molds of various sizes and shapes, thereby making it unnecessary to construct special frames for each type of mold. The above listing of advantages of the improved blank 10 is not intended to exhaust the list of possible advantages thereof.

The mold frame carrier 14, in conjunction with each frame blank 10 is designed to be used, as clearly shown in Figs. 1 and 2.

Said frame carrier 14 is purely illustrative of standard frame carriers now in use.

Since frame carrier 14 is conventional, it will only be described in sufficient detail to indicate the manner in which the frame blank 10 is adapted to be used in conjunction therewith. Said carrier 14 has parallel, vertically and longitudinally extending side arms 15. These side arms 15 have longitudinally extending and co-extensive guide grooves 16 in the inner faces thereof. These grooves 16 are of generally rectangular shape. Arms 15 are connected by cross arm 17 adjacent the rear end thereof, and by a further cross arm (not shown) adjacent the front thereof, these cross arms 17 being located below the level of the guide grooves 16. An upstanding end stop 18 is fixed to arm 17 adjacent the rear thereof, and a catch 19 is fixed to said arm 17 adjacent the front thereof.

The mold frame formed from blank 10 is adapted to be inserted into carrier 14 from the front end thereof with the flanges 12 respectively resting frictionally slidably upon the lower faces of the respective grooves 16, and with the side flanges 11 respectively located frictionally slidably against the outer faces of the respective grooves 16. This is clearly shown in Figs. 1 and 2. Accordingly, it is a simple matter to dimension the blank 10 and the flanges 11 and 12, so that it may be accommodated in the standard mold frame carrier of a standard machine. The details of construction of the mold frame carrier 14 and of the end stop 18 and the detachable latch 19 may be varied, without affecting the principles of construction of the mold frame blank 10.

It may be noted that the optional end flanges 13 of mold blank 10 make it possible for the catch or latch 19 to be detachably located in front of the rear flange 13 when the frame is assembled with the carrier, to prevent accidental separation thereof. However, other engaging means may be substituted for the end flanges 13 on the completed mold frame.

As stated above, the body of blank 10 may be cut out or punched out in any desired manner to accommodate molds of selected size and shape. By way of example, the further optional processing of frame blank 10 into a complete mold is described with reference to the specific mold 20 shown in Figs. 8 and 9, said mold 20 being also shown in a number of other views of the drawings.

Said mold 20 has a bottom wall 21 with grooves and ridges of any desired shape so as to produce desired surface ornamentation of the final chocolate bar, said wall 21 being in this instance generally rectangular in shape. Said mold 20 includes an upstanding side wall 22 extending continuously around the periphery of bottom wall 21. Said mold 20 also includes a flange 23 which is integral with side wall 22 at the upper edge thereof and which extends transversely outwardly therefrom. A side portion 23a of said flange 23 is of greater width than the remainder of the flange. Said mold 20 may be formed from a unitary piece of metal material by methods well known in the industry.

The final mold frame 24 which is formed from mold blank 10, in order to accommodate a plurality of molds 20, is shown in detail in Figs. 6 and 7 and is also shown in other views.

In order to form the frame 24, a plurality of rectangular cut-outs 25 are punched out of the body of blank 10. In the working model represented in the drawings, there are two longitudinal rows of four cut-outs 25 each, the corresponding cut-outs of each row being laterally alined. Each said cut-out 25 is sized to receive the side wall 22 of a respective mold 20, with the flange 23 thereof resting upon the upper face of the mold frame.

The formation of the cut-outs 25 results in providing the body of frame 24 with a border 26 extending around the perimeter thereof, with a center longitudinal strip 27 and with strips 28 separating the cut-outs 25 of each longitudinal row. Optionally and preferably, strip 27 is of greater width than strip 26. Optionally, a plurality of holes 29 are punched in the center strip 27 in longitudinal alinement, there being, as an example, two such holes 29 between each pair of laterally alined cut-outs 25.

Optionally and preferably, a plurality of strengthening braces 30 are fixed to the lower face of mold frame 24, by welding or other suitable means. Each said brace 30 is of channel shape with parallel arms 31 depending from its central portion. Optionally and preferably, these braces 30 extend laterally across substantially the entire width of frame 24, with braces 30 being respectively located beyond the front and rear sides of cut-outs 25, and also across the intermediate strips 28, as is clearly shown in the drawings.

The channel shape of these braces 30 is highly advantageous, since the braces add considerable structural rigidity to the frame while adding a minimum of weight thereto.

In order to assemble the molds 20 with the mold frame 24, each mold 20 is inserted in a respective mold opening 25 of frame 24 with flange 23 resting upon the upper face of said frame, and with flange portion 23a extending inwardly. Preferably, the inner edges of adjacent flange portions 23a abut each other, with each flange portion 23a partially overlying a pair of holes 29. Also, the end edges of flanges 23 of successive molds 20 preferably abut each other. This arrangement is clearly shown in Fig. 1.

Molten solder 9 is flowed between the lower faces of the respective flanges 23 and the upper face of the mold frame 24. When the solder 9 solidifies, the molds 20 are firmly secured to mold frame 24. While the solder may be flowed into position by any suitable means, the provision of the holes 29 is highly advantageous since it makes it possible to flow the solder from the bottom side of mold frame 24, through said holes 29, and hence under flange 23.

While it is possible to secure the molds to the frame by other suitable means, such as welding, for many purposes I prefer the use of solder. If one of the molds is damaged it is relatively easier to melt the solder and hence remove the mold from the frame, so that it may be replaced by a new mold.

Another important advantage of the present invention is the fact that it makes it possible to replace individual molds, thereby making it unnecessary to replace the entire assembly when only one of the molds is damaged.

Another important advantage of the invention is the fact that opposing faces of flange 23 and frame 24 are soldered together, rather than merely butting end edges being soldered together, which is a much weaker construction.

While I have disclosed a preferred embodiment of my invention, and have indicated various changes, omissions and additions which may be made therein, it will be apparent that various other changes, omissions and additions may be made in the invention without departing from the scope and spirit thereof.

I claim:

1. For use in the manufacture of chocolate bars or the like, a mold frame-and-mold assembly comprising a rectangular, longitudinally extending metal top plate, sides depending from said top plate and integral therewith, said sides and said flanges being substantially longitudinally co-extensive with said top plate, a plurality of laterally extending strengthening ribs fixed to the lower face of said top plate and extending substantially between the sides thereof and being longitudinally spaced from each other, said top plate having laterally paired and spaced mold receiving openings between successive ribs and having a plurality of longitudinally alined solder receiving openings interposed in the plate remaining portions between said paired mold receiving openings, and molds, each said mold having a hollow body portion which is adapted to be inserted within a mold receiving opening, said mold having a top opening and having a transverse top peripheral flange which is adapted to rest upon said top plate and at least partly overlie said solder receiving openings, said mold being adapted to be soldered to said mold frame by flowing solder from the lower side of said top plate through said solder receiving openings and between said flange and said top plate.

2. For use in the manufacture of chocolate bars or the like, a mold frame-and-mold assembly comprising a rectangular, longitudinally extending top plate, sides depending from said top plate and integral therewith, opposed flanges extending inwardly from the lower edges of said sides and integral therewith, said top plate having a plurality of spaced mold receiving openings arranged in longitudinally extending columns and laterally extending rows, and a plurality of molds, each said mold having a hollow body portion which is adapted to be inserted within a mold receiving opening, said mold having a top opening and having a transverse top peripheral flange which rests upon said top plate, said flange being secured to said top plate, each said flange having a rectangular outer periphery, the end edges of adjacent flanges in each column abutting each other over the entire length thereof, the side edges of adjacent flanges in each row abutting each other over the entire length thereof.

3. For use in the manufacture of chocolate bars or the like, a mold frame-and-mold assembly comprising a rectangular, longitudinally extending metal top plate, sides depending from said top plate and integral therewith, opposed flanges extending inwardly from the lower edges of said sides and integral therewith, said sides and said flanges being substantially longitudinally co-extensive with said top plate, a plurality of laterally extending strengthening ribs fixed to the lower face of said top plate and extending substantially between the sides thereof and being longitudinally spaced from each other, said top plate having laterally paired and spaced mold receiving openings between successive ribs, and molds, each said mold having a hollow body portion which is adapted to be inserted within a mold receiving opening, said mold having a top opening and having a transverse top peripheral flange which is adapted to rest upon said top plate, said flange being secured to said top plate.

References Cited in the file of this patent

UNITED STATES PATENTS

| | | |
|---|---|---|
| 184,086 | Kittredge et al. | Nov. 7, 1876 |
| 579,542 | Morrison | Mar. 23, 1897 |
| 986,500 | Reiche | Mar. 14, 1911 |
| 2,147,583 | Thomas | Feb. 14, 1939 |
| 2,169,485 | Bucher | Aug. 15, 1939 |